(12) United States Patent
Gholami et al.

(10) Patent No.: US 8,274,647 B2
(45) Date of Patent: Sep. 25, 2012

(54) METHOD OF CLASSIFYING A GRADED-INDEX MULTIMODE OPTICAL FIBER

(75) Inventors: Asghar Gholami, Isfahan (IR); Denis Molin, Draveil (FR); Pierre Sillard, Le Chesnay (FR); Yves Lumineau, Herblay (FR)

(73) Assignee: Draka Comteq, B.V., Amsterdam (NL)

( * ) Notice: Subject to any disclaimer, the term of this patent is extended or adjusted under 35 U.S.C. 154(b) by 283 days.

(21) Appl. No.: 12/683,775

(22) Filed: Jan. 7, 2010

(65) Prior Publication Data
US 2010/0171945 A1    Jul. 8, 2010

(30) Foreign Application Priority Data

Jan. 8, 2009  (FR) ...................................... 09 00050

(51) Int. Cl.
*G01N 21/00* (2006.01)
(52) U.S. Cl. ...................................................... 356/73.1
(58) Field of Classification Search .................... None
See application file for complete search history.

(56) References Cited

U.S. PATENT DOCUMENTS

| | | |
|---|---|---|
| 3,989,350 A | 11/1976 | Cohen et al. |
| 4,111,525 A | 9/1978 | Kaminow et al. |
| 4,184,744 A | 1/1980 | Onoda et al. |
| 4,222,631 A | 9/1980 | Olshansky |
| 4,229,070 A | 10/1980 | Olshansky et al. |
| 4,230,396 A | 10/1980 | Olshansky et al. |
| 4,339,174 A | 7/1982 | Levin |
| 4,406,517 A | 9/1983 | Olshansky |
| 4,465,335 A | 8/1984 | Eppes |
| 4,473,273 A | 9/1984 | Hodge |
| 4,636,235 A | 1/1987 | Glessner et al. |
| 4,636,236 A | 1/1987 | Glessner et al. |
| 4,715,695 A | 12/1987 | Nishimura et al. |
| 4,723,828 A | 2/1988 | Garel-Jones et al. |
| 4,838,643 A | 6/1989 | Hodges et al. |
| 5,142,603 A | 8/1992 | Forrester |
| 5,381,503 A | 1/1995 | Kanamori et al. |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |

(Continued)

FOREIGN PATENT DOCUMENTS

EP    1921478 A1    5/2008

(Continued)

OTHER PUBLICATIONS

Sasaki, P.L. Francois, D.N. Payne, "Accuracy and resolution of preform index-profiling by the spatial-filtering method," ECOC'81, 6.4-1, Copenhagen, Denmark, 1981.

(Continued)

*Primary Examiner* — Tu Nguyen
(74) *Attorney, Agent, or Firm* — Summa, Additon & Ashe, P.A.

(57) ABSTRACT

A method of classifying a graded-index multimode optical fiber includes taking a series of individual measurements at a single wavelength, and using the measurements to characterize the departure of the multimode optical fiber's actual index profile from the corresponding nominal index profile. The measurements, coupled with intermodal dispersion or EMB measurement, may be used to predict the approximate transmission properties of the optical fiber at wavelengths other than the measurement wavelength.

25 Claims, 6 Drawing Sheets

U.S. PATENT DOCUMENTS

| | | | |
|---|---|---|---|
| 5,841,933 | A | 11/1998 | Hoaglin et al. |
| 5,911,023 | A | 6/1999 | Risch et al. |
| 5,982,968 | A | 11/1999 | Stulpin |
| 6,002,818 | A | 12/1999 | Fatehi et al. |
| 6,035,087 | A | 3/2000 | Bonicel et al. |
| 6,066,397 | A | 5/2000 | Risch et al. |
| 6,085,009 | A | 7/2000 | Risch et al. |
| 6,134,363 | A | 10/2000 | Hinson et al. |
| 6,175,677 | B1 | 1/2001 | Yang et al. |
| 6,181,857 | B1 | 1/2001 | Emeterio et al. |
| 6,185,346 | B1 | 2/2001 | Asawa et al. |
| 6,210,802 | B1 | 4/2001 | Risch et al. |
| 6,215,931 | B1 | 4/2001 | Risch et al. |
| 6,292,612 | B1 | 9/2001 | Golowich et al. |
| 6,314,224 | B1 | 11/2001 | Stevens et al. |
| 6,321,012 | B1 | 11/2001 | Shen |
| 6,321,014 | B1 | 11/2001 | Overton et al. |
| 6,334,016 | B1 | 12/2001 | Greer, IV |
| 6,381,390 | B1 | 4/2002 | Hutton et al. |
| 6,470,126 | B1 | 10/2002 | Mukasa |
| 6,493,491 | B1 | 12/2002 | Shen et al. |
| 6,580,863 | B2 | 6/2003 | Yegnanarayanan et al. |
| 6,603,908 | B2 | 8/2003 | Dallas et al. |
| 6,606,437 | B1 | 8/2003 | Mukasa et al. |
| 6,618,538 | B2 | 9/2003 | Nechitailo et al. |
| 6,658,184 | B2 | 12/2003 | Bourget et al. |
| 6,724,965 | B2 | 4/2004 | Abbott et al. |
| 6,724,966 | B2 | 4/2004 | Mukasa |
| 6,735,985 | B2 | 5/2004 | DiGiovanni et al. |
| 6,749,446 | B2 | 6/2004 | Nechitailo |
| 6,750,294 | B2 | 6/2004 | Sugiyama et al. |
| 6,771,865 | B2 | 8/2004 | Blaszyk et al. |
| 6,904,218 | B2 | 6/2005 | Sun et al. |
| 6,912,347 | B2 | 6/2005 | Rossi et al. |
| 6,922,515 | B2 | 7/2005 | Nechitailo et al. |
| 6,941,049 | B2 | 9/2005 | Risch et al. |
| 7,006,751 | B2 | 2/2006 | Provost et al. |
| 7,043,126 | B2 | 5/2006 | Guan et al. |
| 7,043,128 | B2 | 5/2006 | DiGiovanni et al. |
| 7,045,010 | B2 | 5/2006 | Sturman, Jr. |
| 7,089,765 | B2 | 8/2006 | Schaper et al. |
| 7,162,128 | B2 | 1/2007 | Lovie et al. |
| 7,315,677 | B1 | 1/2008 | Li et al. |
| 7,322,122 | B2 | 1/2008 | Overton et al. |
| 7,346,244 | B2 | 3/2008 | Gowan et al. |
| 7,356,234 | B2 | 4/2008 | de Montmorillon et al. |
| 7,406,235 | B2 | 7/2008 | Guan et al. |
| 7,421,172 | B2 | 9/2008 | Matthijsse et al. |
| 7,421,174 | B2 | 9/2008 | Fleming, Jr. et al. |
| 7,483,613 | B2 | 1/2009 | Bigot-Astruc et al. |
| 7,539,381 | B2 | 5/2009 | Chen et al. |
| 7,555,186 | B2 | 6/2009 | Flammer et al. |
| 7,567,739 | B2 | 7/2009 | Overton et al. |
| 7,570,852 | B2 | 8/2009 | Nothofer et al. |
| 7,587,111 | B2 | 9/2009 | de Montmorillon et al. |
| 7,599,589 | B2 | 10/2009 | Overton et al. |
| 7,623,747 | B2 | 11/2009 | de Montmorillon et al. |
| 7,639,915 | B2 | 12/2009 | Parris et al. |
| 7,646,952 | B2 | 1/2010 | Parris |
| 7,646,954 | B2 | 1/2010 | Tatat |
| 7,646,955 | B2 | 1/2010 | Donlagic |
| 7,783,149 | B2 | 8/2010 | Fini |
| 7,787,731 | B2 | 8/2010 | Bookbinder et al. |
| 7,817,257 | B2 * | 10/2010 | Takenaga et al. ............ 356/73.1 |
| 7,826,691 | B2 | 11/2010 | Matthijsse et al. |
| 7,865,050 | B1 | 1/2011 | Sun et al. |
| 7,878,712 | B2 | 2/2011 | Shimotakahara et al. |
| 7,903,918 | B1 | 3/2011 | Bickham et al. |
| 2002/0102082 | A1 | 8/2002 | Sarchi et al. |
| 2002/0176678 | A1 | 11/2002 | Mukasa |
| 2002/0197038 | A1 | 12/2002 | Abbott et al. |
| 2003/0024276 | A1 | 2/2003 | Anderson et al. |
| 2005/0008312 | A1 | 1/2005 | Jang et al. |
| 2008/0292262 | A1 | 11/2008 | Overton et al. |
| 2009/0003785 | A1 | 1/2009 | Parris et al. |
| 2009/0041414 | A1 | 2/2009 | Lavenne et al. |
| 2009/0059353 | A1 | 3/2009 | Fini |
| 2009/0092365 | A1 | 4/2009 | Donlagic |
| 2009/0154888 | A1 | 6/2009 | Abbott, III et al. |
| 2009/0169163 | A1 | 7/2009 | Abbott, III et al. |
| 2009/0175583 | A1 | 7/2009 | Overton |
| 2009/0214167 | A1 | 8/2009 | Lookadoo et al. |
| 2009/0252469 | A1 | 10/2009 | Sillard et al. |
| 2009/0279835 | A1 | 11/2009 | de Montmorillon et al. |
| 2009/0279836 | A1 | 11/2009 | de Montmorillon et al. |
| 2010/0021170 | A1 | 1/2010 | Lumineau et al. |
| 2010/0028020 | A1 | 2/2010 | Gholami et al. |
| 2010/0040336 | A1 | 2/2010 | Chen et al. |
| 2010/0067858 | A1 | 3/2010 | Kim et al. |
| 2010/0171945 | A1 | 7/2010 | Gholami et al. |
| 2010/0220966 | A1 | 9/2010 | Bennett |
| 2010/0254653 | A1 | 10/2010 | Molin et al. |
| 2010/0310218 | A1 | 12/2010 | Molin et al. |
| 2011/0002590 | A1 | 1/2011 | Ooizumi et al. |
| 2011/0037183 | A1 | 2/2011 | Tudury et al. |
| 2011/0044594 | A1 | 2/2011 | Tudury et al. |
| 2011/0044596 | A1 | 2/2011 | Zhang et al. |
| 2011/0054861 | A1 | 3/2011 | Lane |
| 2011/0054862 | A1 | 3/2011 | Pimpinella et al. |
| 2011/0058781 | A1 | 3/2011 | Molin et al. |
| 2011/0064367 | A1 | 3/2011 | Molin et al. |

FOREIGN PATENT DOCUMENTS

| | | |
|---|---|---|
| EP | 2207022 A1 | 7/2010 |
| JP | 08-304636 A | 11/1996 |
| JP | 11-064665 A | 3/1999 |
| JP | 2000-347057 A2 | 12/2000 |
| JP | 2002-318315 A | 10/2002 |
| JP | 2006-047719 A | 2/2006 |
| JP | 2006-078543 A | 3/2006 |
| JP | 2006-227173 A | 8/2006 |
| WO | 03/081301 A1 | 10/2003 |
| WO | 2005/106544 A1 | 11/2005 |
| WO | 2009/062131 A1 | 5/2009 |
| WO | 2009/078962 A1 | 6/2009 |
| WO | 2010/036684 A2 | 4/2010 |
| WO | 2011/040830 A1 | 4/2011 |

OTHER PUBLICATIONS

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

European Search Report and Written Opinion in counterpart European Application No. 09075577 dated Apr. 26, 2010, pp. 1-9.

European Office Action in counterpart European Application No. 09075577 dated Jun. 30, 2011, pp. 1-4.

Kolesar, P.F., et al., "Understanding multimode bandwidth and differential mode delay measurements and their applications," Proceedings of the 51st International Wire and Cable Symposium, pp. 453-460.

Coleman, D., et al., "Calculated EMB enhances 10GbE performance reliability for laser-optimized 50/125 μm multimode fiber," Corning Cable Systems Whitepaper.

Morikuni et al., "Simulation-Based Prediction of Multimode Fiber Bandwidth for 10 Gb/s Systems," 15th Annual Meeting of the IEEE Lasers & Electro-Optics Society, Glascow, Scotland, pp. 604-604, (2002).

Bell et al., "Evolution of 50/125 um Fiber Since the Publication of IEEE 802.3ae," International Wire & Cable Symposium, Proceedings of the 52nd IWCS/Focus, pp. 60-67, downloaded from http://www.corning.com/assets/0/433/573/637/645/950BA748-8F9A-457E-A5CA-6A2166B78A60.pdf on May 4, 2010.

French Search Report and Written Opinion in counterpart French Application No. 09/00050, dated Aug. 31, 2009.

Yi Sun et al., "Advanced Multimode Fiber for High Speed, Short Reach Interconnect," Proceedings of the SPIE, vol. 7134, pp. 71341L-71341L15, (2008).

Telecommunications Industry Association (TIA), "FOTP-220 standard" refers to the document "FOTP 220 differential mode delay measurement of multimode fiber in the time domain" published on Jan. 1, 2003, Document No. TIA 455 220 A.

Partial European Search Report in counterpart European Application No. 09075577, dated Jan. 25, 2010.

* cited by examiner

METHOD OF CLASSIFYING A GRADED-INDEX MULTIMODE OPTICAL FIBER

CROSS REFERENCE TO PRIORITY APPLICATION

This application claims the benefit of pending French Application No. 09/00050 for "Fibre optique multimodale a gradient d'indice, procedes de caracterisation et de fabrication d'une telle fibre" (filed Jan. 8, 2009, at the French Patent Office), which is hereby incorporated by reference in its entirety.

FIELD OF THE INVENTION

The present invention relates to a method of manufacturing and selecting graded-index multimode optical fibers.

BACKGROUND

Multimode optical fibers are typically used for short to medium length connections (e.g., local networks). Multimode optical fibers allow the use of relatively inexpensive connectors and light sources, such as vertical cavity surface-emitting lasers (i.e., VCSELs) or light-emitting diodes (i.e., LEDs), which would not be suitable for use with single-mode (i.e., monomode) fibers. Multimode optical fibers, however, present intermodal dispersion, which greatly reduces their bit-rate over lengths greater than a few kilometers, or even a few hundred meters, thus preventing them from being used over long distances.

To reduce intermodal dispersion, the multimode optical fibers used in telecommunications generally have a core with a refractive index that decreases progressively from the center of the fiber to its interface with a cladding. In general, the index profile is described by a relationship known as the "α profile" (or alpha profile), as follows:

$$n(r) = \begin{cases} n_0 \cdot \sqrt{1 - 2\Delta\left(\frac{r}{a}\right)^\alpha} & r \leq a \\ n_0 \cdot \sqrt{1 - 2\Delta} & r \geq a \end{cases}$$

wherein:
  $n_0$ is the refractive index on the optical axis of the fiber;
  r is the distance from the optical axis of the fiber;
  a is the radius of the core of the fiber;
  $\Delta$ is a non-dimensional parameter indicative of an index difference between the core and the cladding of the fiber; and
  $\alpha$ is a non-dimensional parameter, indicative of the shape of the index profile.

The parameter $\Delta$ is known as the index contrast, and for $\Delta \ll 1$, $$n(r \geq a) = n_0 \cdot (1 - \sqrt{1-2\Delta}) \approx \Delta \cdot n_0.$$

Alpha profile fibers and a method of fabricating such optical fibers are disclosed in U.S. Pat. No. 3,989,350, which is hereby incorporated by reference.

The performance of multimode optical fibers has improved to such an extent that they may be used in high bit-rate connections over distances of several hundreds of meters. By way of example, the 10 gigabit (Gb) Ethernet standard (i.e., 10 GbE) provides a profile fibers to be used over distances less than or equal to 300 meters (m).

Typically, manufactured optical fibers (i.e., non-theoretical fibers) present some dispersion from the theoretical α profile. In this regard, the refractive index profile of a fabricated optical fiber may differ slightly from the nominal (i.e., set or theoretical) profile. Unfortunately, transmission properties are sensitive to variations in the refractive index profile. Fabricating graded-index multimode optical fibers thus includes two stages: (i) proper production of the fibers; and (ii) classifying or otherwise evaluating the produced fibers to discard those that do not comply with the specifications.

The real (i.e., actual or non-theoretical) refractive index profile of a multimode optical fiber is rarely measured directly. Typically, it is sufficient to measure the optical fiber's intermodal dispersion at a predefined wavelength $\lambda_0$. Thus, the previously-mentioned 10 GbE standard requires an effective modal bandwidth (EMB) that is greater than or equal to 2000 megahertz-kilometers (MHz·km) at a wavelength of 850 nanometers (nm). In this regard, the EMB is not, strictly speaking, a bandwidth, but rather the product of a bandwidth multiplied by a propagation distance.

A method of determining EMB is defined in the FOTP-220 standard and its information annexes (e.g., Annex B and Annex D). In brief, the EMB parameter is determined by performing a plurality of individual measurements. Each individual measurement typically includes injecting a spatially localized light pulse into the inlet face of the optical fiber at a predefined radial offset from the axis of the optical fiber (and thus from the center of the face), and determining the time characteristic of the light pulse after propagation through the optical fiber (i.e., from the optical fiber's inlet face to the optical fiber's outlet face). Individual measurements are repeated at different radial offset values. The results of these various individual measurements are combined to determine an effective mode transfer function of the optical fiber, from which the EMB may be determined. To evaluate an optical fiber having a core diameter of 50 microns (i.e., micrometers or μm), the FOTP-220 standard requires 24 individual measurements to be performed.

As used herein, the term "FOTP-220 standard" refers to the document "FOTP-220 differential mode delay measurement of multimode fiber in the time domain" published on Jan. 1, 2003, by the Telecommunications Industry Association (TIA) and identified as information document TIA-455-220-A. The FOTP-220 standard, including its Annexes, is hereby incorporated by reference.

The method of the FOTP-220 standard determines the performance of the optical fiber in terms of bandwidth at a single wavelength only (e.g., 850 nanometers±10 nanometers for the 10 GbE standard).

Using the method of the FOTP-220 standard to determine the optical fiber's performance at a plurality of wavelengths (e.g., over a range of wavelengths), a plurality of independent EMB measurements must be performed (i.e., several tens or indeed several hundreds of individual measurements).

As previously explained, measurements are taken at the time of fabrication to cull optical fibers that do not present the required performance characteristics as a result of fluctuations in their actual index profiles. Making a plurality of individual measurements to determine the optical fiber's performance at multiple wavelengths can greatly increase the cost of producing the optical fiber.

Thus, there remains a need for a low-cost method of determining the performance of a graded-index multimode optical fiber over multiple wavelengths.

SUMMARY

Accordingly, in one aspect, the invention embraces a method of classifying the transmission properties of a graded-index multimode optical fiber over a range of wavelengths in a manner that is simpler and faster—and therefore less expensive. Typically, the method includes taking a series of individual measurements at a single wavelength and using the measurements to determine the extent to which the multimode optical fiber's actual index profile departs from the corresponding nominal index profile. The measurements, coupled with the intermodal dispersion and/or EMB, may be used to predict the approximate transmission properties of the optical fiber at wavelengths other than the measurement wavelength. Typically, it can be assumed that the dispersion of the index profiles is not excessive because of the quality of modern fiber production methods.

In an exemplary embodiment, the method of classifying a graded-index multimode optical fiber includes injecting a light pulse at a predefined wavelength (e.g., a particular, predetermined testing wavelength) into an optical fiber's core via an "inlet" face. The light pulse is injected with a predefined radial offset from the center of the inlet face. The light pulse is detected at the optical fiber's "outlet" face. In this regard, the time and shape of the light pulse (e.g., the time characteristic of the light pulse) is typically altered after propagation through the optical fiber. Typically, the injection and detection of the light pulse is repeated for a plurality of predefined-radial-offset values. The measurements may then be used to determine the optical fiber's transfer function and radial offset bandwidth (ROB) as a function of the radial offset. Additionally, the measurements may be used to determine the EMB at the predefined wavelength.

In another exemplary embodiment, the method includes verifying whether an optical fiber's EMB at a predefined wavelength lies within a predetermined range of values. Typically, the method further includes verifying whether the ROB as a function of the radial offset is greater than a predetermined threshold for all values of the radial offset lying within a range of 0 to $R_1$, where $R_1$ is less than or equal to the radius of the core of the optical fiber.

In another aspect, the invention relates to a method of manufacturing graded-index multimode optical fibers. Typically, the method includes manufacturing multimode optical fibers possessing a nominal index profile (e.g., an α-type profile) and classifying the manufactured optical fibers. Typically, only a portion of the fibers is selected. The selected optical fibers typically possess (i) an effective modal bandwidth lying within a predetermined range and (ii) a ROB that is greater than a predetermined threshold for the radial offset values lying within a range of 0 to $R_1$.

In yet another aspect, the invention relates to a graded-index multimode optical fiber presenting an α-type refractive index profile having an α of between about 2.0 and 2.1 (e.g., between about 2.04 and 2.06).

In exemplary embodiments, the optical fiber possesses, at a wavelength of 850 nanometers, a −3 dB bandwidth of at least 6000 MHz·km for all radial offsets between 0 and $R_1$, where $R_1$ is between about 70 percent and 90 percent of the optical fiber core's radius (i.e., between about 0.7× and 0.9× the radius of the core). For example, $R_1$ may be 18 microns in an optical fiber having a core diameter of 50 microns.

In a particular exemplary embodiment, the optical fiber may also possess, at a wavelength of 850 nanometers, an effective modal bandwidth as defined in compliance with the Jan. 1, 2003, FOTP-220 standard (e.g., an EMB of between about 3000 MHz·km and 6000 MHz·km).

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1A:
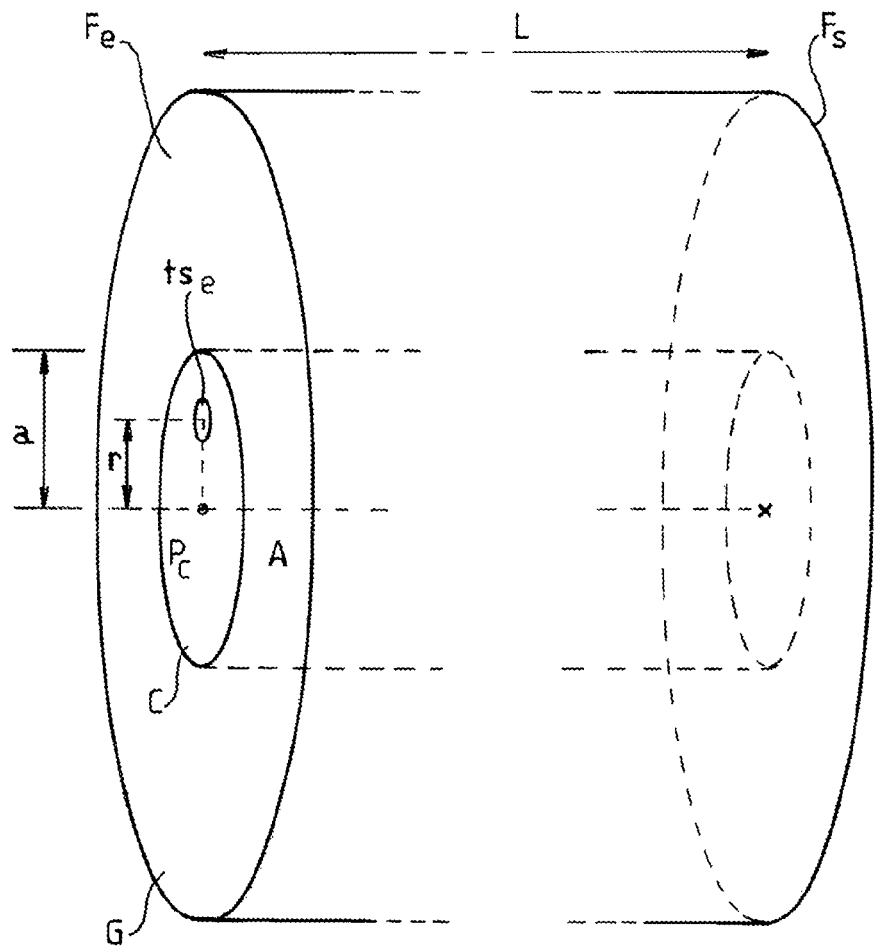
FIG. 1A schematically depicts the inlet face of an exemplary graded-index multimode optical fiber.

The present invention embraces methods of classifying a graded-index multimode optical fiber.

An exemplary embodiment of the method includes injecting a light pulse into the inlet face of an optical fiber's core at a predefined radial offset. The light pulse is detected at the optical fiber's outlet face to measure the time characteristic of the pulse after propagation through the optical fiber. The measurements (i.e., injecting the light pulse and detecting the light pulse) are typically performed at a plurality of predefined radial offsets (i.e., predefined-radial-offset values). Typically the measurements are used to determine the optical fiber's transfer function and ROB as a function of the radial offset. The radial offset values typically vary over a range of 0 to a, where a is the radius of the optical fiber's core.

An exemplary method includes injecting a light pulse into the optical fiber with a propagation direction that is substantially parallel to the axis of the fiber, and perpendicular to the inlet face of the optical fiber. Typically, each light pulse is spatially localized on the inlet face of the optical fiber. In particular, the spatial extent (e.g., spatial area) of each light pulse may be substantially equivalent to the extent of the single spatial mode of a single-mode optical fiber at a predefined wavelength.

In some exemplary embodiments, the steps of injecting and detecting the light pulse are implemented in compliance with the FOTP-220 standard. In this regard, the predefined wavelength is typically 850 nanometers±10 nanometers (i.e., between about 840 nanometers and 860 nanometers)

As previously discussed, a graded-index multimode optical fiber typically possesses an index profile given by the relationship:

$$n(r) = \begin{cases} n_0 \cdot \sqrt{1 - 2\Delta\left(\frac{r}{a}\right)^\alpha} & r \leq a \\ n_0 \cdot \sqrt{1 - 2\Delta} & r \geq a \end{cases}$$

wherein:
  $n_0$ is the refractive index on the optical axis of the fiber;
  r is the distance from the optical axis of the fiber;
  a is the radius of the core of the fiber;
  $\Delta$ is a non-dimensional parameter indicative of an index difference between the core and the cladding of the fiber; and
  $\alpha$ is a non-dimensional parameter, indicative of the shape of the index profile.

In exemplary embodiments, the method is performed on an optical fiber possessing an index profile where the value of the parameter $\alpha$ lies between about 2.0 and 2.1 (e.g., between about 2.04 and 2.06).

In exemplary embodiments, the method includes determining an effective modal bandwidth at a predefined wavelength from the measurements obtained by injecting and detecting the light pulse at a plurality of predefined radial offsets (i.e., predefined-radial-offset values). Typically, the effective modal bandwidth is determined in compliance with the FOTP-220 standard. Typically, the method includes verifying whether the effective modal bandwidth lies within a predetermined range of values (e.g., between about 3000 MHz·km and 6000 MHz·km).

The method may also include verifying whether, as a function of the radial offset, the ROB is greater than a predetermined threshold for all values of the radial offset lying in a range of 0 to $R_1$, where $R_1$ is less than or equal to the radius of the core of the optical fiber. For example, the predetermined threshold for the ROB (e.g., the −3 dB bandwidth) may be 6000 MHz·km. In exemplary embodiments, $R_1$ is between about 0.7 and 0.9 times (i.e., about 0.7× to about 0.9×) the radius of the optical fiber's core.

FIG. 1A schematically depicts a multimode optical fiber of length L having a core C of radius a, surrounded by cladding G. The optical fiber has an inlet face $F_e$ and an outlet face $F_s$ which are perpendicular to the optical axis A of the optical fiber. The optical axis A passes through the inlet face $F_e$ at the center point $P_c$ of the core C.

Figure 1B:
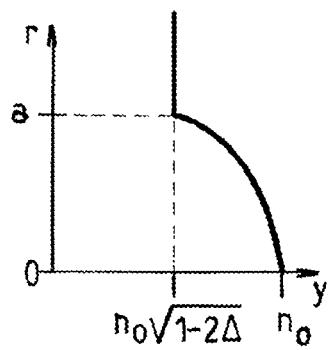
FIG. 1B graphically depicts the index profile of an exemplary graded-index multimode optical fiber.

FIG. 1B graphically depicts an $\alpha$-type radial index profile. In FIG. 1B, the value of $\Delta$ is exaggerated for illustration. Typically, $\Delta$ is on the order of about 1 percent.

As previously explained, classifying an optical fiber typically requires a plurality of discrete measurements. Each discrete measurement typically includes injecting a spatially-localized light pulse into the optical fiber's core C. The injection is performed by projecting a small light beam onto the optical fiber's inlet face $F_e$. In FIG. 1A, the reference $ts_e$ indicates the spot formed on the inlet face $F_e$ by the light beam.

In accordance with the FOTP-220 standard, the signal injection light pulse may be obtained by coupling a light source (e.g., a semiconductor or titanium-sapphire laser) to a single-mode optical fiber having its outlet face positioned 10 microns or less from the inlet face $F_e$ of the multimode optical fiber. The spot $ts_e$ is typically described by a Gaussian distribution of intensity:

$$I(r) = \exp\left(\frac{-8r^2}{MFD^2}\right)$$

where the diameter MFD is given by:

MFD=8.7λ−2390 nanometers (±500 nanometers).

In this regard, at a wavelength of between about 850 nanometers and 1100 nanometers, the diameter of the spot $ts_e$ is between about 5.005 microns and 7.18 microns, with a tolerance of ±0.5 microns (e.g., about 4.505 microns to about 7.68 microns). The beam typically propagates in a direction parallel to the multimode optical fiber's axis A, with tolerance of about 1°.

In general, the spot $ts_e$ is not centered relative to the core of the multimode fiber, but presents a radial offset indicated as r, as measured from the center point $P_c$. Each individual measurement is typically performed with a different radial offset r, having a value lying in the range of 0 to a (or even greater than a). The different radial offsets r (i.e., predefined-radial-offset values) may differ by increments (e.g., a step size) on the order of about 1 micron.

Figure 1C:
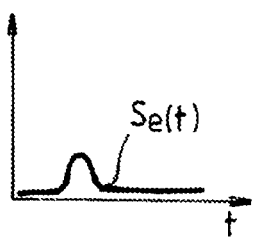
FIG. 1C graphically depicts an exemplary time profile of a light pulse at the inlet face of an exemplary graded-index multimode optical fiber.
Figure 1D:
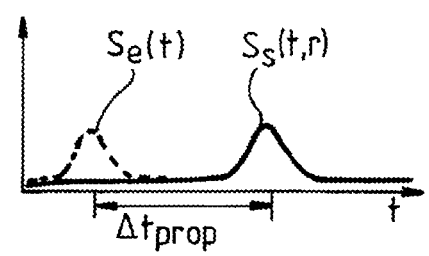
FIG. 1D graphically depicts an exemplary time profile of a light pulse at the outlet face of an exemplary graded-index multimode optical fiber.

FIGS. 1C and 1D schematically depict the time profile of the pulse $s_e(t)$ as injected at the inlet of the fiber and the profile of the same pulse $s_s(t,r)$ as measured at the outlet. The inlet pulse $s_e(t)$ is typically assumed to be identical for all of the discrete measurements, and thus independent of the radial offset r (i.e., the inlet pulse varies as a function of time, not radial offset). After propagating along the multimode fiber, the outlet pulse is delayed by a time $\Delta t_{prop}$ relative to the inlet pulse. Additionally, the pulse's time profile is deformed. The pulse's delay and profile deformation (e.g., the time characteristic of the light pulse) depend on the radial offset r. Because the pulse presents a narrow spectrum band, it can be assumed that the deformation of its time profile is primarily due to the multimode nature of the propagation, and that chromatic dispersion plays a secondary, or even negligible, part in the deformation. If chromatic dispersion plays a non-negligible role in the deformation of the pulse's time profile, the effect of the chromatic dispersion may be eliminated using deconvolution as described in the FOTP-220 standard (e.g., Annex A, which, as noted, is incorporated by reference).

The EMBc (i.e., the calculated or determined EMB) may be calculated from a series of discrete measurements. The calculation typically includes approximating the field distribution of a light source compatible with the multimode fiber (e.g., a VCSEL) by a linear combination of spatially-localized beams having different radial offsets r. The various spatially-localized inlet pulses, all having the same time profile $s_e(t)$, are linearly combined with appropriate weighting, thereby making it possible to simulate a light pulse injected into the fiber by the light source. The corresponding outlet pulses $s_s(t,r)$ are linearly combined to simulate the outlet pulse that would be obtained by using the light source. The transfer function of the optical fiber (or the light source) may be determined by calculating the ratio between Fourier transforms of the time profiles of the outlet and inlet pulses. The −3 dB bandwidth may be deduced from the transfer function of the optical fiber. Typically, the −1.5 dB bandwidth is measured directly and extrapolated to −3 dB.

For further details on this technique, reference can be made to the following publications: P. F. Kolesar and D. J. Mazzarese, "*Understanding multimode bandwidth and differential mode delay measurements and their applications*," Proceedings of the 51st International Wire and Cable Symposium, pages 453-460, which is hereby incorporated by reference; and D. Coleman and Philip Bell "*Calculated EMB enhances 10 GbE performance reliability for laser-optimized 50/125 μm multimode fiber*," Corning Cable Systems Whitepaper, which is hereby incorporated by reference.

The FOTP-220 standard (and in particular its Annex D) provides linear combination parameters corresponding to a plurality of light sources that are notional (i.e., theoretical) but representative of sources that are genuinely available. The smallest modal bandwidth obtained from these notional sources may be taken as the calculated EMB (EMBc).

Figure 2:
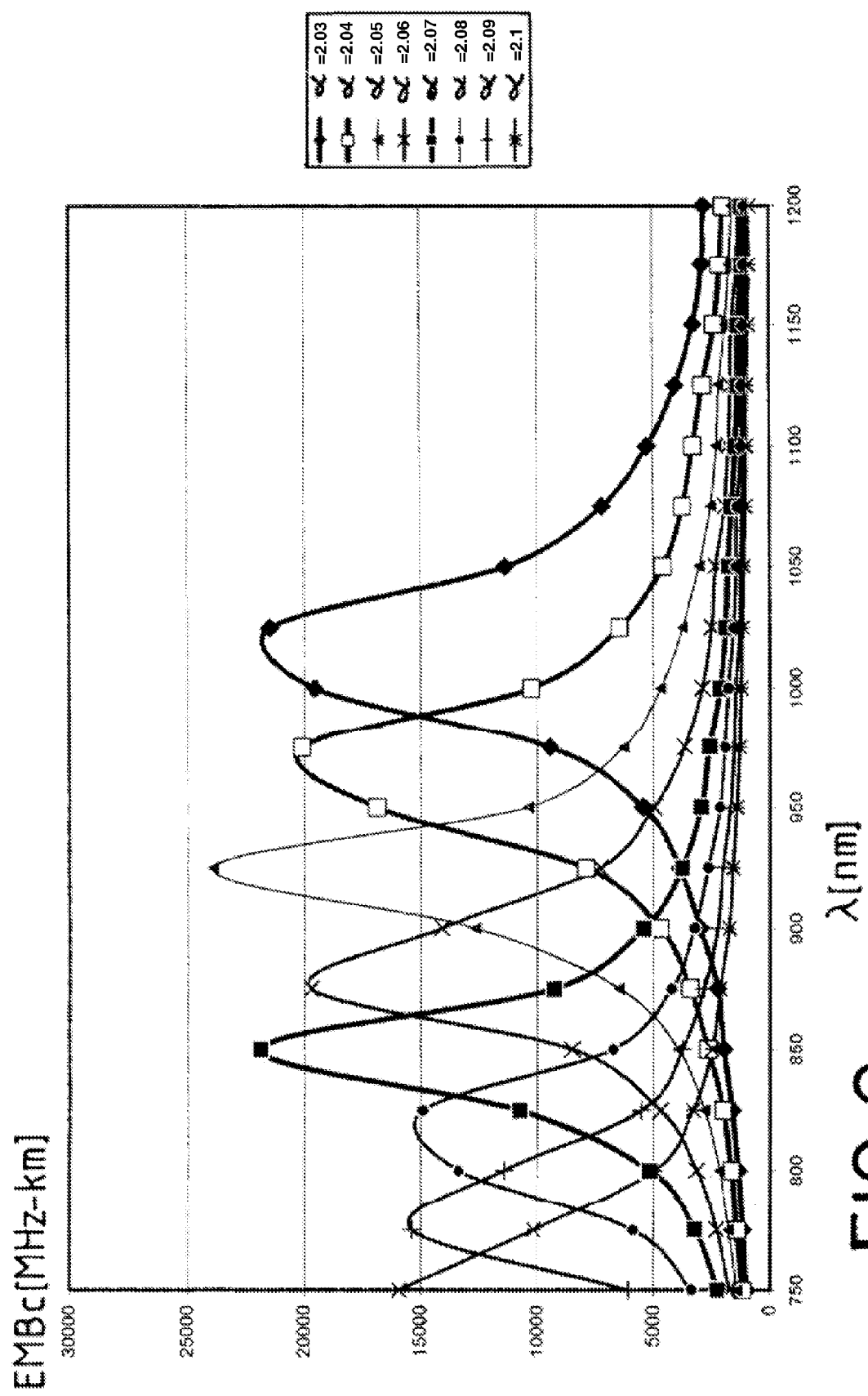
FIG. 2 graphically depicts the effective modal bandwidth (EMB) as a function of wavelength for a plurality of optical fibers having perfect "α-type" profiles.

FIG. 2 graphically depicts EMBc as a function of wavelengths of between about 800 nanometers and 1100 nanometers for a plurality of optical fibers having different index profiles. The optical fibers are silica fibers with $n_0=1.47$ at 633 nanometers, and the optical fibers present perfect α-type profiles. The optical fibers possess a core radius of 25 microns (i.e., a core diameter of 50 microns), a cladding diameter of 125 microns, a Δ of 0.01, and α values between 2.03 and 2.1.

Each depicted optical fiber presents an EMBc that is greater than 2000 MHz·km at a wavelength of 850 nanometers; therefore, each complies with the 10 GbE standard. Nevertheless, among the optical fibers of FIG. 2, only the fiber with an α of 2.05 presents an EMBc greater than or equal to 2000 MHz·km over the entire spectrum band under consideration (i.e., 800 nanometers to 1100 nanometers).

If actual optical fibers did indeed have perfect α-type index profiles, determining the EMBc at one or two wavelengths would be sufficient to determine α unambiguously. Using α, the EMBc at all other wavelengths could be deduced. However, the index profiles of actual fibers are not perfect α-type profiles.

In this regard, embodiments of the method typically utilize information contained in the widening and deformation of the time profile of the light pulses employed in the various single-wavelength (e.g., 850 nanometers) individual measurements to determine the optical properties of the evaluated multimode optical fiber (e.g., time-domain bandwidth measurements).

By way of example, suppose $S_e(f)$ is the Fourier transform of the time profile of the inlet pulse $s_e(t)$, and $S_s(f,r)$ is the Fourier transform of the time profile of the outlet pulse $s_s(t,r)$ for a radial offset r, where f indicates frequency. For each radial offset r it is possible to calculate the transfer function:

$$H^r(f) = \frac{S_s(f,r)}{S_e(f)}.$$

Typically, the −3 dB bandwidth of the transfer function $H^r(f)$ is a function of the radial offset r and is referred to as the radial offset bandwidth ROB(r). That said, it is within the scope of the present invention to determine the radial offset bandwidth without computing the transfer function.

For example, the radial offset bandwidth may be determined by measuring the attenuation of the multimode optical fiber at low modulation frequencies at the wavelength of interest (e.g., using a laser at 850 nanometers and modulating its amplitude with a given modulation frequency to launch a sinusoidal signal). In this regard, a sinusoidal signal having a given modulation frequency is injected into the multimode optical fiber, and the attenuation of the outlet signal is measured. This process (i.e., injecting a sinusoidal signal and measuring the attenuation of the corresponding outlet signal) may be repeated at other modulation frequencies. Each outlet-signal measurement generates a data point for a given modulation frequency. The foregoing is performed at different radial offsets.

Typically, low frequency sinusoidal signals are used to achieve (i) the reference level of attenuation (i.e., the attenuation of the continuous wave at a modulation frequency of zero) and (ii) a few frequencies close to the expected ROB value (i.e., corresponding to 3 dB more attenuation than for the continuous wave). The generated data points may then be used to determine the radial offset bandwidth ROB(r).

In general, the radial offset bandwidth is a continuous function that may be represented by interpolation from measured or known values (e.g., curve fitting or regression analysis using linear, polynomial, spline, or cubic interpolation).

Figure 3:
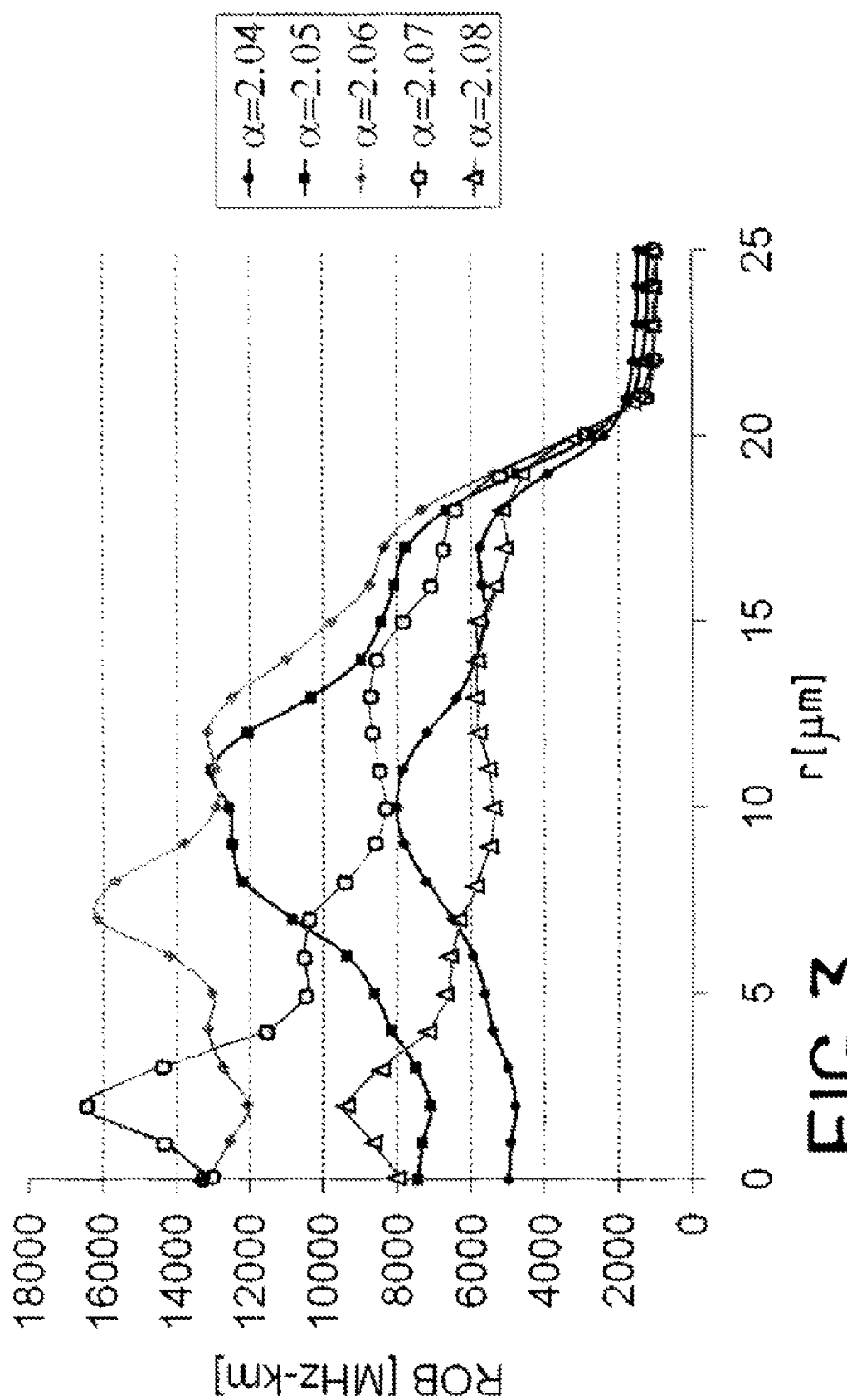
FIG. 3 graphically depicts the radial offset bandwidth (ROB) as a function of radial offset measured at 850 nanometers for a plurality of optical fibers having perfect "α-type" profiles.

FIG. 3 graphically depicts the ROB(r) at 850 nanometers for some of the fibers in FIG. 2. As shown in FIG. 3, ROB(r) depends on the value of the parameter α for values of r between 0 and an offset $R_1$ that is less than the core radius a (e.g., as depicted, $R_1$ is about 18 microns). Beyond this offset $R_1$, the value of ROB(r) depends primarily on the core-cladding interface, and is therefore relatively insensitive to the parameter α. Typically, $R_1$ is between about 70 percent and 90 percent of the radius of the optical fiber's core (i.e., between about 0.7a and 0.9a).

The ROB is highly sensitive to localized defects in the refractive index. Thus, if the optical fiber presents an ROB having a high value when $0<r<R_1$, it can be assumed that the optical fiber's index profile is close to an ideal α-type profile. Furthermore, the optical fiber's index profile may be assumed to be sufficiently regular to enable the EMB measurement performed at a wavelength $\lambda_0$ to be extrapolated to other wavelengths λ. In contrast, if the ROB decreases too quickly as the radial offset r increases, then it is likely that the fiber presents an irregular index profile, making any extrapolation uncertain.

Figure 4:
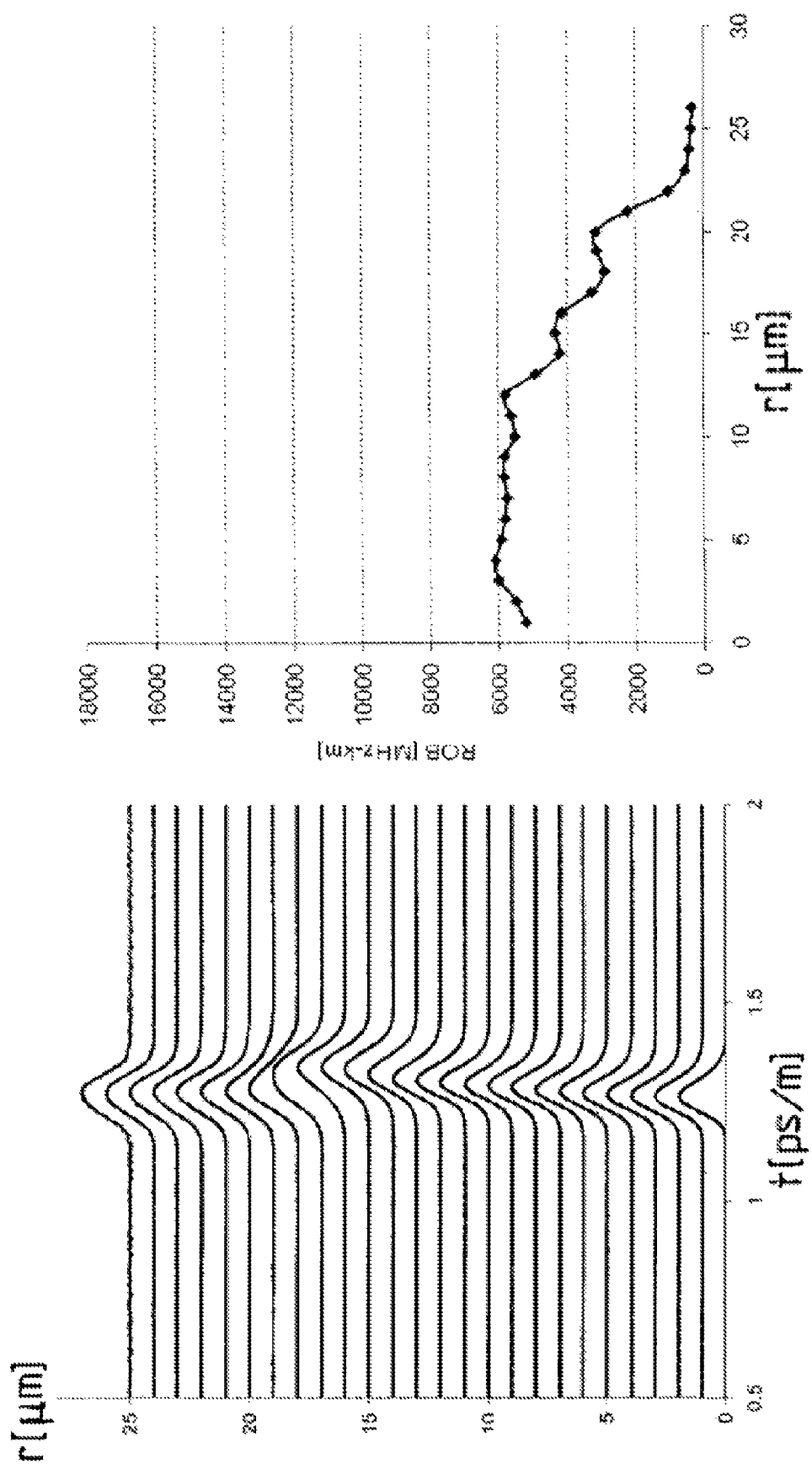
FIG. 4A graphically depicts the time profiles, at 850 nanometers, of the outlet pulse $s_s(t,r)$ for an exemplary optical fiber having an index profile that departs from a perfect "α-type" profile.
FIG. 4B graphically depicts the radial offset bandwidth (ROB) as a function of radial offset measured at 850 nanometers for an exemplary optical fiber having an index profile that departs from a perfect "α-type" profile.
Figure 5:
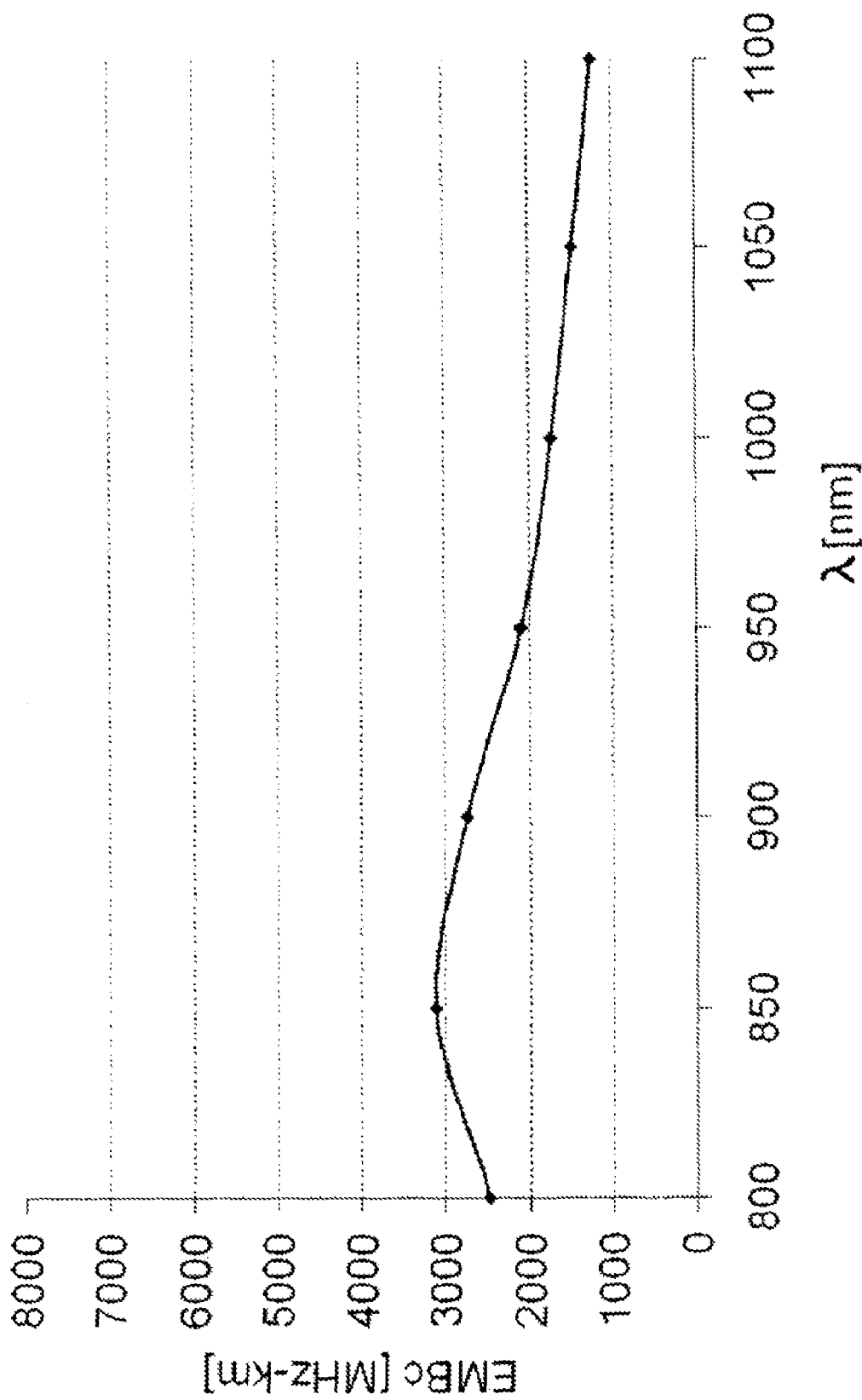
FIG. 5 graphically depicts the EMB as a function of wavelength for an exemplary optical fiber having an index profile that departs from a perfect "α-type" profile.

FIG. 4A graphically depicts $s_s(t,r)$ for an actual multimode optical fiber having a profile that is not a perfect α-type profile. FIG. 4B graphically depicts the corresponding ROB. As shown, the ROB remains approximately equal to 6000 MHz·km for a radial offset r of between about 0 and 12 microns, but then drops rapidly. In this regard, it can be deduced that the optical fiber's actual index profile departs significantly from the nominal α-type profile. As shown in FIG. 5, measuring EMBc as a function of wavelength λ confirms this deductive reasoning. The optical fiber satisfies the condition EMBc≧2000 MHz·km only in the range of 800 nanometers to 850 nanometers, and overall, it presents transmission properties that are less desirable than those of a fiber having an ideal α-type profile.

Nevertheless, referring to FIG. 2, it can be seen that merely determining EMBc at 850 nanometers does not distinguish the actual fiber of FIG. 5 from an "ideal" fiber having an α parameter of between 2.04 and 2.05. Such an ideal fiber has an EMBc of approximately 3000 MHz·km at 850 nanometers and much better broadband transmission properties (i.e., better transmission properties over a range of wavelengths).

In this regard, determining ROB facilitates the identification of fibers having an index profile with defects. It may also help distinguish two "ideal" fibers having α parameters of different values.

For example, as shown in FIG. 2, measuring EMBc at only 850 nanometers does not make it possible to distinguish between an optical fiber having an α parameter of 2.04 and an optical fiber having an α parameter of 2.09. At 850 nanometers, the EMBc for both values of α is approximately 3500

MHz·km. However, only the first optical fiber (i.e., α=2.04) satisfies the specifications of the 10 GbE standard (i.e., EMBc≧2000 MHz·km) over the 800 nanometer to 1100 nanometer band. Analyzing the ROB of each optical fiber, however, makes distinguishing between these two fibers somewhat simple.

In other words, depending on the application, if the optical fiber's ROB drops too quickly, the actual index profile probably departs significantly from the nominal profile, thus making it impossible to extrapolate an EMBc determined at one particular wavelength $\lambda_o$ to other wavelengths. If the ROB indicates that the index profile is sufficiently regular, the ROB can help distinguish between two fibers having different values for the parameter α, even though they have similar values for EMBc at the measurement wavelength $\lambda_o$.

Those having ordinary skill in the art will appreciate that determining ROB does not require additional measurements to be performed, but makes use of data already made available by the measurements used for calculating EMBc at a predefined wavelength. ROB is thus a complement to EMBc.

In a specific exemplary application, the EMBc and the ROB at a wavelength of 850 nanometers can be used to identify fibers presenting EMB≧2000 MHz·km over the entire 800 nanometer to 1100 nanometer band. The identified fibers can typically be used for wavelength-division multiple-access (WDMA) applications at high bit-rates (e.g., 10 Gb/s/channel) over a length of about 300 meters.

Figure 6:
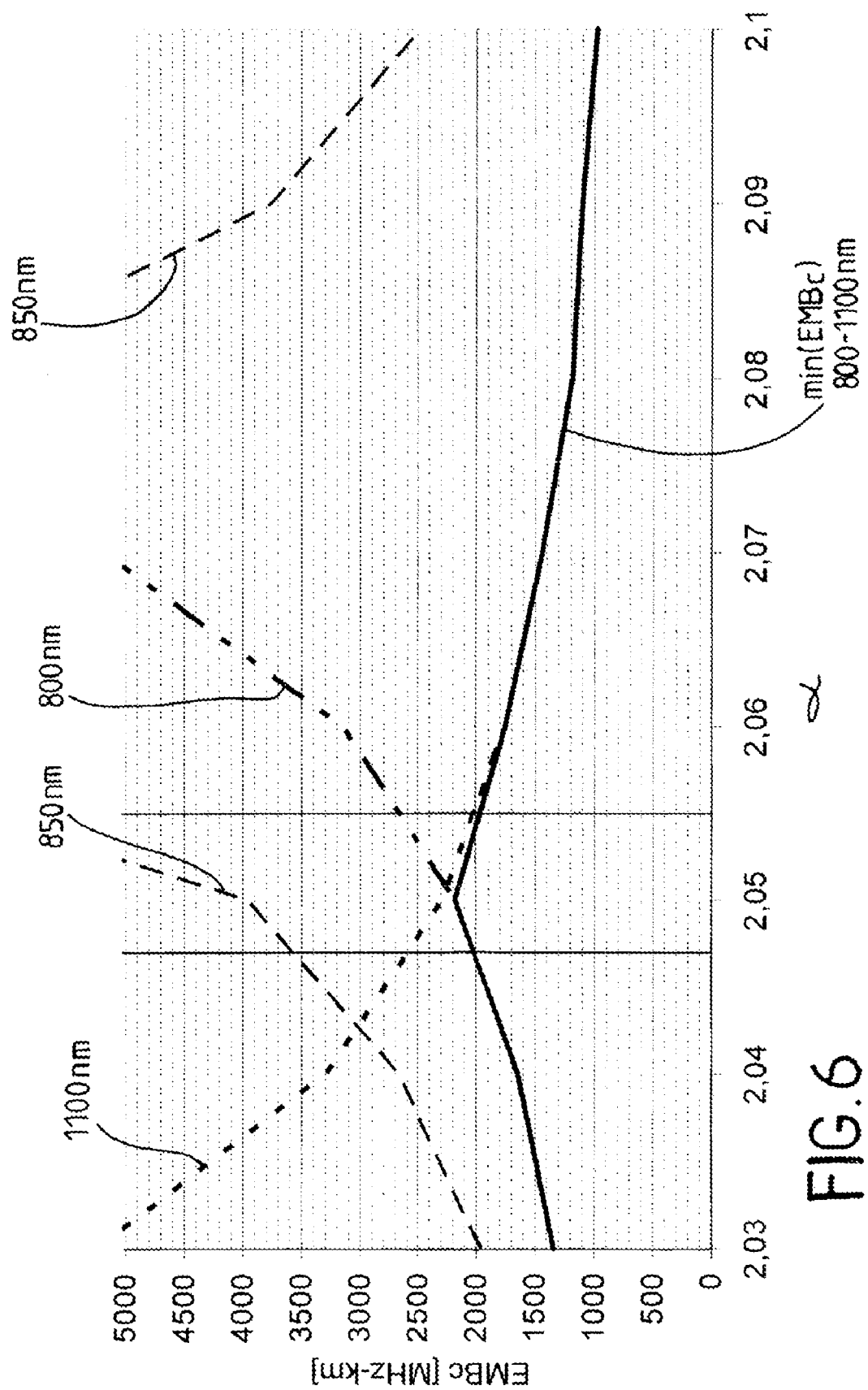
FIG. 6 graphically depicts the EMB at various wavelengths as a function of α for a plurality of optical fibers having perfect "α-type" profiles.

As depicted in FIG. 6, the curve labeled "min(EMBc)800-1100 nm" represents the minimum value of the EMBc as a function of α over the range 800 nanometers to 1100 nanometers. As shown, only an α-type optical fiber with α≅2.05 satisfies this condition. Such a fiber provides, at 850 nanometers, an EMBc that is between about 3000 MHz·km and 6000 MHz·km. See FIGS. 2 and 6. However, merely exhibiting, at 850 nanometers, an EMBc within this range is not sufficient. For example, optical fibers with α≅2.09 also have an EMBc lying in this range at 850 nanometers, yet the EMBc of such optical fibers becomes insufficient at wavelengths λ greater than 950 nanometers (e.g., 1000 nanometers). See FIG. 2.

In this regard, the optical fibers can be distinguished if an additional condition is taken into account, namely if ROB(r) is at least 6000 MHz·km for r less than or equal to 18 microns at 850 nanometers for optical fibers having a core diameter of 50 microns.

More generally, verifying (i) that EMBc at $\lambda_o$ lies in a determined range of values and (ii) that ROB(r) at $\lambda_o$ is greater than a predetermined threshold for $0 < r < R_1$ ensures that the optical fiber presents an index profile that is sufficiently close to a nominal α-type profile. Additionally, this determination facilitates an estimation of the value of the α parameter. The double verification does not require measurements other than those that are already required for determining EMBc at $\lambda_o$, and can, therefore, be performed without additional cost on a fabrication line.

The method of the present invention can be generalized to nominal profiles other than α-type profiles. Therefore, it is within the scope of the present invention to perform the method on multimode optical fibers having different nominal refractive index profiles.

\*\*\*

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.) U.S. patent application Ser. No. 12/629,495 for an Amplifying Optical Fiber and Production Method, filed Dec. 2, 2009, (Pastouret et al.); U.S. patent application Ser. No. 12/633,229 for an Ionizing Radiation-Resistant Optical Fiber Amplifier, filed Dec. 8, 2009, (Regnier et al.); and U.S. patent application Ser. No. 12/636,277 for a Buffered Optical Fiber, filed Dec. 11, 2009, (Testu et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. patent application Ser. No. 12/615,737 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); and U.S. patent application Ser. No. 12/649,758 for a UVLED Apparatus for Curing Glass-Fiber Coatings, filed Dec. 30, 2009, (Hartsuiker et al.).

\* \* \*

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A method of classifying a graded-index multimode optical fiber, comprising:
   (i) injecting into the core of a multimode optical fiber a light pulse having a predefined wavelength, wherein the light pulse is injected at a radial offset from the center of the optical fiber's inlet face;
   (ii) detecting the light pulse at the optical fiber's outlet face to determine the time characteristic of the light pulse after propagation through the optical fiber from the optical fiber's inlet face to the optical fiber's outlet face; and
   (iii) repeating steps (i) and (ii) for a plurality of radial-offset values; and
   (iv) determining the radial offset bandwidth (ROB) as a function of the radial offset.

2. A method according to claim 1, wherein each light pulse is injected into the optical fiber with a propagation direction that is substantially parallel to the optical fiber's central axis and perpendicular to the optical fiber's inlet face.

3. A method according to claim 1, wherein each light pulse is spatially localized on the optical fiber's inlet face.

4. A method according to claim 3, wherein:
   a spatial extent of each light pulse is substantially equivalent to the extent of a single spatial mode of a single-mode optical fiber at the predefined wavelength; and/or
   the radial-offset values vary from the center of the multimode optical fiber's inlet face over a range of at least 0 to a, where a is the core radius of the multimode optical fiber.

5. A method according to claim 1, wherein steps (i) and (ii) are implemented in compliance with the FOTP-220 standard.

6. A method according to claim 1, wherein the predefined wavelength of the light pulse is 850 nanometers ±10 nanometers.

7. A method according to claim 1, wherein the step of determining the radial offset bandwidth comprises determining the optical fiber's transfer function.

8. A method according to claim 1, wherein the step of determining the radial offset bandwidth does not include determining the optical fiber's entire transfer function.

9. A method according to claim 1, wherein the optical fiber possesses an index profile given by the relationship:

$$n(r) = \begin{cases} n_0 \cdot \sqrt{1 - 2\Delta\left(\frac{r}{a}\right)^\alpha} & r \leq a \\ n_0 \cdot \sqrt{1 - 2\Delta} & r \geq a \end{cases}$$

wherein:
$n_0$ is the refractive index on the optical axis of the optical fiber;
r is the distance from the optical axis of the optical fiber;
a is the radius of the core of the optical fiber;
$\Delta$ is a non-dimensional parameter indicative of an index difference between the core and the cladding of the optical fiber; and
$\alpha$ is a non-dimensional parameter, indicative of the shape of the index profile.

10. A method according to claim 9, wherein a value of the parameter $\alpha$ is between about 2.0 and 2.1.

11. A method according to claim 9, wherein a value of the parameter $\alpha$ is between about 2.04 and 2.06.

12. A method according to claim 1, comprising determining an effective modal bandwidth at the predefined wavelength.

13. A method according to claim 12, comprising:
verifying whether the effective modal bandwidth is within a predetermined range of values; and
verifying whether the radial offset bandwidth as a function of the radial offset determined in step (iv) is greater than a predetermined threshold for all radial-offset values between about 0 and $R_1$, where $R_1$ is less than or equal to the core radius of the optical fiber.

14. A method according to claim 13, wherein:
steps (i) and (ii) are implemented in compliance with the FOTP-220 standard;
the predefined wavelength is 850 nanometers ±10 nanometers;
the optical fiber possesses an index profile given by the relationship:

$$n(r) = \begin{cases} n_0 \cdot \sqrt{1 - 2\Delta\left(\frac{r}{a}\right)^\alpha} & r \leq a \\ n_0 \cdot \sqrt{1 - 2\Delta} & r \geq a \end{cases}$$

wherein:
$n_0$ is the refractive index on the optical axis of the optical fiber;
r is the distance from the optical axis of the optical fiber;
a is the radius of the core of the optical fiber;
$\Delta$ is a non-dimensional parameter indicative of an index difference between the core and the cladding of the optical fiber; and
$\alpha$ is a non-dimensional parameter, indicative of the shape of the index profile, wherein $\alpha$ is between about 2.04 and 2.06; and the effective modal bandwidth is a calculated effective modal bandwidth determined in compliance with the FOTP-220 standard.

15. A method according to claim 13, comprising the step of classifying the optical fiber as satisfactory if the optical fiber meets the effective-bandwidth verification and the radial-offset bandwidth verification.

16. A method according to claim 15, comprising the step of selecting the optical fiber classified as satisfactory.

17. A method according to claim 15, comprising the step of deploying the optical fiber classified as satisfactory.

18. A method according to claim 12, comprising:
determining whether the effective modal bandwidth is between about 3000 MHz·km and 6000 MHz·km; and
determining whether the radial offset bandwidth as a function of the radial offset values determined in step (iv) is greater than or equal to 6000 MHz·km for all radial-offset values between about 0 and $R_1$, where $R_1$ is between about 70 percent and 90 percent of the radius of the optical fiber's core.

19. A method of evaluating and selecting a multimode optical fiber, comprising:
providing a multimode optical fiber having a core, an inlet face, and an outlet face;
injecting into the multimode optical fiber a light pulse of a testing wavelength, the light pulse being injected at a radial offset from the center of the multimode optical fiber's inlet face;
detecting the light pulse at the multimode optical fiber's outlet face to measure the time characteristic of the light pulse after propagation through the multimode optical fiber;
repeating for a plurality of radial-offset values the steps of injecting a light pulse and detecting the light pulse;
determining, at the testing wavelength, the effective modal bandwidth (EMB) of the multimode optical fiber via the measured time characteristics of the light pulse;
assessing if the multimode optical fiber's determined effective modal bandwidth is within a predetermined range;
determining the multimode optical fiber's radial offset bandwidth (ROB) as a function of the radial offset via the measured time characteristics of the light pulse; and
assessing if the multimode optical fiber's determined radial offset bandwidth meets or exceeds a threshold value for all radial-offset values between 0 and $R_1$, wherein $R_1$ is less than or equal to the core radius of the multimode optical fiber.

20. A method according to claim 19, wherein the step of assessing the multimode optical fiber's determined effective modal bandwidth comprises determining whether the multimode optical fiber's determined effective modal bandwidth is between about 3000 MHz·km and 6000 MHz·km.

21. A method according to claim 19, wherein the step of assessing if the multimode optical fiber's determined radial offset bandwidth meets or exceeds a threshold value comprises determining whether the multimode optical fiber's radial offset bandwidth is at least 6000 MHz·km for all radial-offset values between 0 and $R_1$.

22. A method according to claim 19, wherein $R_1$ is between about 70 percent and 90 percent of the core radius of the multimode optical fiber.

23. A method of classifying a graded-index multimode optical fiber, comprising:
(i) injecting into the core of a multimode optical fiber a light pulse having a predefined wavelength, wherein the light pulse is injected at a radial offset from the center of the optical fiber's inlet face;
(ii) detecting the light pulse at the optical fiber's outlet face to determine the time characteristic of the light pulse after propagation through the optical fiber from the optical fiber's inlet face to the optical fiber's outlet face; and
(iii) repeating steps (i) and (ii) for a plurality of radial-offset values; and
(iv) determining the radial offset bandwidth (ROB) as a function of the radial offset; and
(v) determining whether the radial offset bandwidth as a function of the radial offset values determined in step (iv) is greater than or equal to 6000 MHz·km for all radial-offset values between about 0 and $R_1$, where $R_1$ is about 70 percent of the radius of the optical fiber's core.

24. A method according to claim 23, wherein $R_1$ is about 90 percent of the radius of the optical fiber's core.

25. A method according to claim 23, comprising:
determining an effective modal bandwidth at the predefined wavelength; and
determining whether the effective modal bandwidth is between about 3000 MHz·km and 6000 MHz·km.

* * * * *